US006738866B2

(12) United States Patent
Ting

(10) Patent No.: US 6,738,866 B2
(45) Date of Patent: May 18, 2004

(54) MEMORY MANAGEMENT OF DATA BUFFERS INCORPORATING HIERARCHICAL VICTIM SELECTION

(75) Inventor: Edison L. Ting, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 373 days.

(21) Appl. No.: 09/850,897

(22) Filed: May 8, 2001

(65) Prior Publication Data

US 2002/0013887 A1 Jan. 31, 2002

(30) Foreign Application Priority Data

Jun. 20, 2000 (CA) .............................................. 2312444

(51) Int. Cl.[7] .............................................. G06F 12/00
(52) U.S. Cl. ........................ 711/133; 711/134; 711/136; 711/144
(58) Field of Search ................................ 711/133, 134, 711/136, 144

(56) References Cited

U.S. PATENT DOCUMENTS

| 5,423,017 A | * | 6/1995 | Parikh ......................... 711/167 |
| 5,787,471 A | * | 7/1998 | Inoue et al. ................. 711/133 |
| 5,881,266 A | * | 3/1999 | Matsumoto .................. 711/134 |
| 6,012,126 A | * | 1/2000 | Aggarwal et al. ........... 711/133 |
| 6,098,152 A | * | 8/2000 | Mounes-Toussi ........... 711/134 |
| 6,128,713 A | * | 10/2000 | Eisler et al. ................. 711/159 |
| 6,449,695 B1 | * | 9/2002 | Bereznyi et al. ............ 711/134 |

* cited by examiner

Primary Examiner—Mano Padmanabhan
Assistant Examiner—Paul A Baker
(74) Attorney, Agent, or Firm—Lynn L. Augspurger, Esq.; Kevin P. Radigan, Esq.; Heslin Rothenberg Farley & Mesiti P.C.

(57) ABSTRACT

A data buffer memory management method and system is provided for increasing the effectiveness and efficiency of buffer replacement selection. Hierarchical Victim Selection (HVS) identifies hot buffer pages, warm buffer pages and cold buffer pages through weights, reference counts, reassignment of levels and ageing of levels, and then explicitly avoids victimizing hot pages while favoring cold pages in the hierarchy. Unlike LRU, pages in the system are identified by both a static manner (through weights) and in a dynamic manner (through reference counts, reassignment of levels and ageing of levels). HVS provides higher concurrency by allowing pages to be victimized from different levels simultaneously. Unlike other approaches, Hierarchical Victim Selection provides the infrastructure for page cleaners to ensure that the next candidate victims will be clean pages by segregating dirty pages in hierarchical levels having multiple separate lists so that the dirty pages may be cleaned asynchronously.

41 Claims, 4 Drawing Sheets

MEMORY MANAGEMENT OF DATA BUFFERS INCORPORATING HIERARCHICAL VICTIM SELECTION

PRIOR FOREIGN APPLICATION

This application claims priority from Canadian patent application number 2,312,444, filed Jun. 20, 2000, which is hereby incorporated herein by reference in its entirety.

TECHNICAL FIELD

The invention concerns generally memory management and in particular a data buffer memory management method, computer program product and system for increasing the effectiveness and efficiency of buffer replacement selection.

BACKGROUND OF THE INVENTION

The invention concerns, by illustrative example, the buffer memory of a database management system or DBMS. In modern processing, a buffer memory provides a quick, relatively small-capacity interface between a processor and a generally slow, large-capacity data storage memory. Buffer memory typically comprise a set of buffers intended to store extracts from the data memory such as a cache memory for receiving blocks of data from the data memory. A DBMS may be run by a computer having a processor, buffer memory (e.g. physical memory usually extended via virtual memory techniques), I/O devices such as a keyboard and a video display terminal, and large capacity data storage. An operating system provides the environment to run the DBMS. Typically, database extracts from the slower, large-capacity data memory are stored as pages in the buffer memory for use by the processor. Memory management of the buffers in the buffer memory is accomplished via a buffer manager operated by the processor.

If there are insufficient free pages in the buffer memory to read in new data, the buffer manager employs page replacement or victim selection policies to free pages. The most commonly known replacement policy is generally referred to as Least Recently Used (LRU). This policy orders a list of the buffers in the cache memory according to the time of their last use. When pages become candidates for page replacement at the time they are unpinned, they are added to the tail of the list. When the buffer manager does not find a page in the cache memory, an event known as a cache miss, it requests the page from the database for loading into the buffer memory, while the LRU policy picks which buffer was least recently used, choosing the buffer at the head of the list in order to record the new page. Pages in the list that are referenced (i.e. cache hit) before being replaced are removed from the list and added to the tail when unpinned.

This optimization procedure suffers from the fact that it doesn't account for pages that are accessed more frequently, making them less favorable victims. The policy assumes that the nth page in the LRU page list is less likely to be reused than the nth+1 page. It may be that the nth page has a higher access rate than the nth+1 page and is therefore less favorable as a victim for replacement.

There are similarities between data base buffer management and operating system virtual memory management. U.S. Pat. No. 5,423,017 of Parikh entitled "Method of and Apparatus for Increasing Efficiency of Ager", issued Jun. 6, 1995, discusses a novel way for operating systems to swap/page out processes from physical memory in a page based virtual memory management system. It classifies processes into four classes based on the amount of run time each has accumulated, and then chooses to swap/page out processes that have been running the least. The method and system disclosed therein handle process data, which is made of code and data segments, and does not distinguish between the clean and dirty data pages in data segments during swap/page outs. Further, processes are assigned to classes for aging based upon their most recent perceived use only as measured by counting CPU time slices.

The method disclosed in U.S. Pat. No. 5,423,017 takes into account run time information, in this case, a count of CPU time slices, as a measure of recent activity level or perceived use to predict the need to retain a processes' pages in the memory.

U.S. Pat. No. 5,870,551 of Ozden et al. entitled "Lookahead Buffer Replacement Method Using Ratio of Clients Access Order Offsets and Buffer Data Block Offsets" issued Feb. 9, 1999 introduces two manners of estimating anticipated use by measuring current use conditions in this continuous multimedia data distribution environment. In the first manner, for each data buffer in the cache, a future is determined by examining the requirements for each client that will access the buffer. The buffer with the lowest anticipated future is allocated for early replacement. In the second method, an estimate is made of the next time a buffer will be accessed by a client by analyzing the relative position or distance of the clients to the buffer. Buffers associated with a client having higher distances are allocated for release before those having lower distances.

Neither method disclosed in the respective patents employs estimates of future use that may be independent of current use conditions.

As an alternative to LRU, clock based algorithms provide a variable to point to a page considered for replacement. To approximate LRU behavior and to handle hot pages, each page has an associated weight count, which is set on page unpin, and decremented whenever the clock is pointing to the page. If the weight becomes zero, the page is chosen for replacement, otherwise, the clock is made to point to the next page to be evaluated. Access to the clock is serialized.

What is needed in the art is a more effective and efficient memory management using page buffers.

SUMMARY OF THE INVENTION

It is an object of the invention to provide a memory management and in particular a data buffer memory management method, computer program product and system for increasing the effectiveness and efficiency of buffer replacement selection.

The invention provides, in a first aspect, a method for managing memory using page buffers. The method comprises a step for determining, for each buffer, a measure of the favorability for victimizing the buffer; a step for assigning each buffer in an order to one of a plurality of levels, said one level selected according to the measure of the favorability for victimizing the buffer, the plurality of levels denoting a buffer hierarchy for prioritizing the victimization of buffers; and a step for victimizing the buffers based on the buffer hierarchy and the order of the buffers in the levels. The method may further place the buffers in cold, warm or hot levels. The method may further comprise a step for determining if the buffer has previously been assigned to a level and, if so, a step for determining a further measure of favorability for victimization for the buffer previously assigned. In such a case, the step for assigning is based additionally on the further measure of favorability for victimization.

Additionally, the method may further comprise a step for determining a buffer content characteristic for each buffer, typically a clean/dirty status of the buffer; the step for assigning is based additionally on the buffer content characteristic and, typically, the buffer hierarchy distinguishes clean buffers in the plurality of levels from dirty buffers in the plurality of levels. Further a step for transforming the dirty buffers in the buffer hierarchy to clean buffers in the buffer hierarchy may be present.

A step for aging the buffers in the levels to identify buffers as eligible for victimization according to the buffer hierarchy and the order of the buffers in the levels may also be provided.

According to the invention, the step for victimizing comprises a step for determining a preferred level from the plurality of levels from which to release a buffer according to a preferred victimization scheme; a step for locating the buffer for releasing upon examination of the preferred level; and a step for releasing the buffer. If the preferred level has no buffer for releasing, there is provided a step for examining one or more additional levels according to the buffer hierarchy and the order of the buffers in the levels to locate the buffer for releasing.

The measure of the favorability for victimizing the buffer may be indicated by either a perceived use measure of the buffer, a future use measure of the buffer or both such measures.

Further according to one method, the order by which the buffer is assigned to the level is a least recently used order.

The invention also has the subsidiary purpose of a computer program product comprising a recording medium having means recorded on the medium for instructing a computer to perform the method. As a corollary, the invention also has as its purpose a memory management system for a computer system having a memory using page buffers. Hierarchical Victim Selection (HVS) identifies hot pages and cold pages through weights, reference counts, reassignment of levels and ageing of levels, and then explicitly avoids victimizing hot pages while favoring cold pages in the hierarchy. Unlike LRU, hot and cold pages in the system are identified by both a static manner (through weights) and in a dynamic manner (through reference counts, reassignment of levels and ageing of levels). HVS provides higher concurrency by allowing pages to be victimized from different levels simultaneously. Unlike other approaches, Hierarchical Victim Selection provides the infrastructure for page cleaners to ensure that the next candidate victims will be clean pages by segregating dirty pages in hierarchical levels having multiple separate lists so that the dirty pages may be cleaned asynchronously.

BRIEF DESCRIPTION OF THE DRAWINGS

The characteristics and advantages of the invention are brought out in the following descriptions, given by way of example and illustrated in the attached drawings where.

BEST MODE FOR CARRYING OUT THE INVENTION

Figure 1:
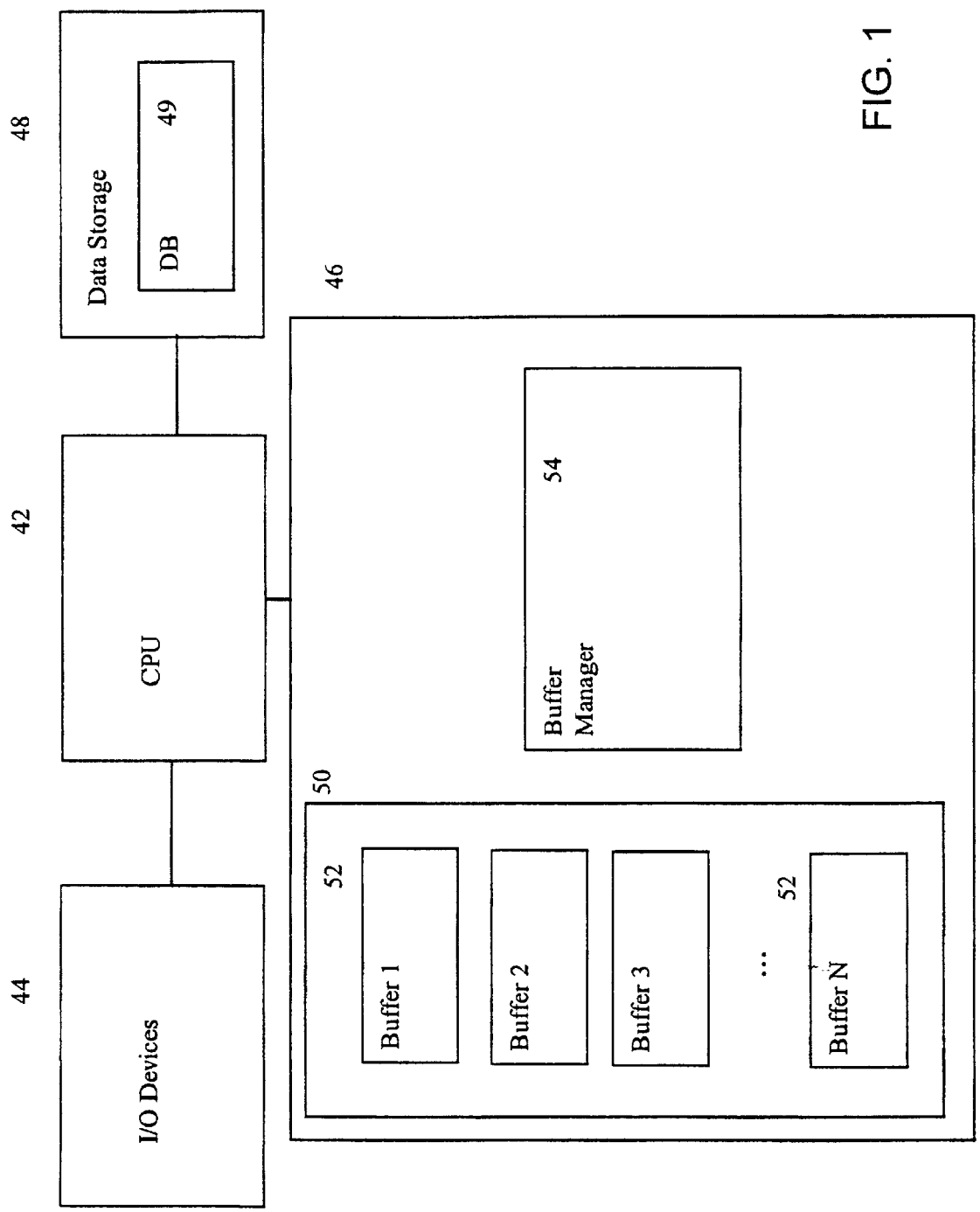
FIG. 1 is a schematic view of a computer system according to the invention including a memory management system for a data base and including a set of buffers operated according to the method of the invention.

FIG. 1 illustrates a schematic view of a computer system 40 including a central processor (CPU) 42 connected to I/O devices 44, a buffer memory 46 and to a data storage memory 48 housing a data base 49. The buffer memory 46 includes a bufferpool 50 of N page buffers 52 and a buffer manager 54 of the pool 50. The N buffers 52 are each suitable for storing an extract from the data base 49, for example, of one page of 4 kilobytes.

Figure 2:
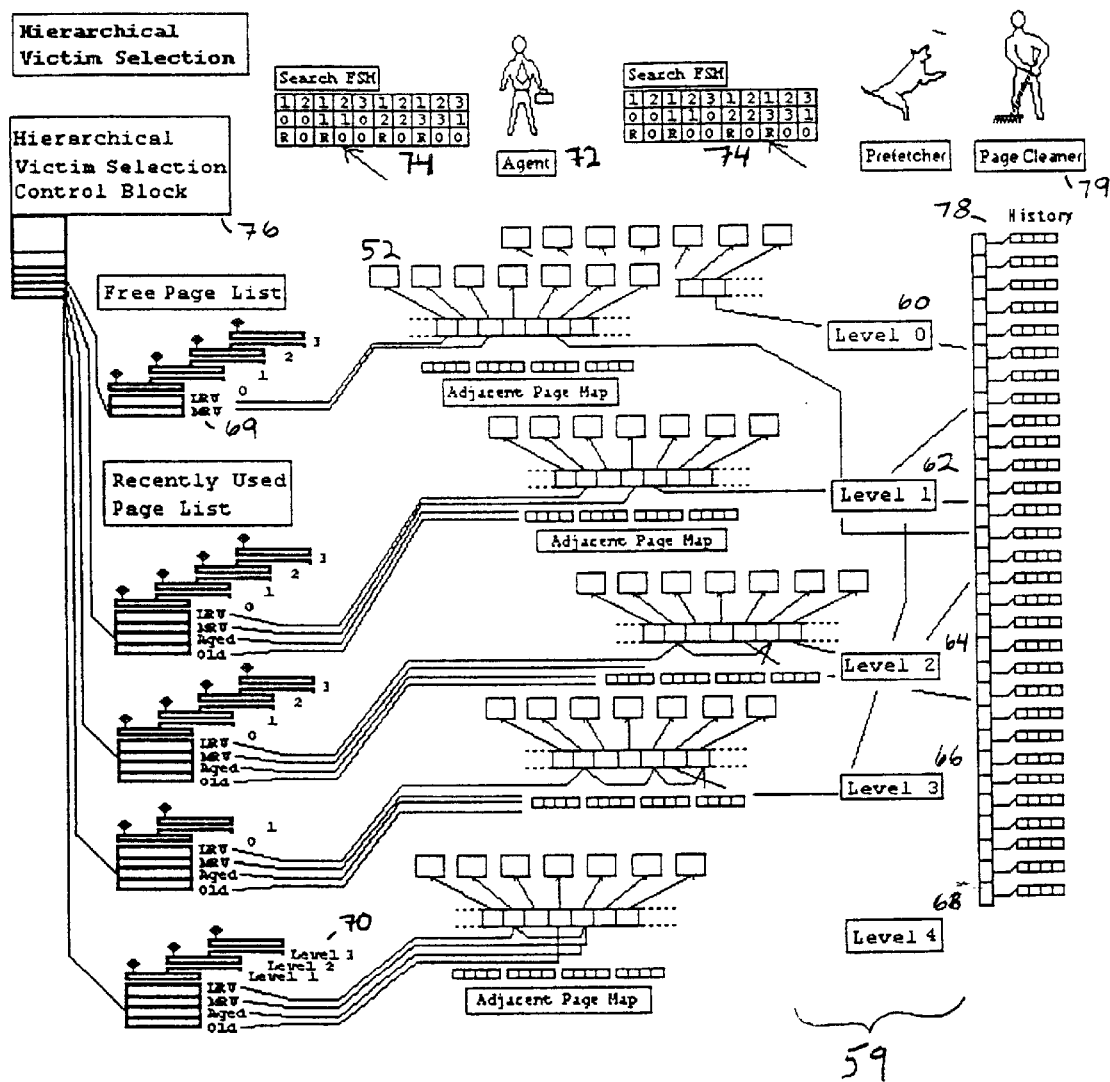
FIG. 2 illustrates a method for managing a set of buffers represented in FIG. 1.
Figure 3:
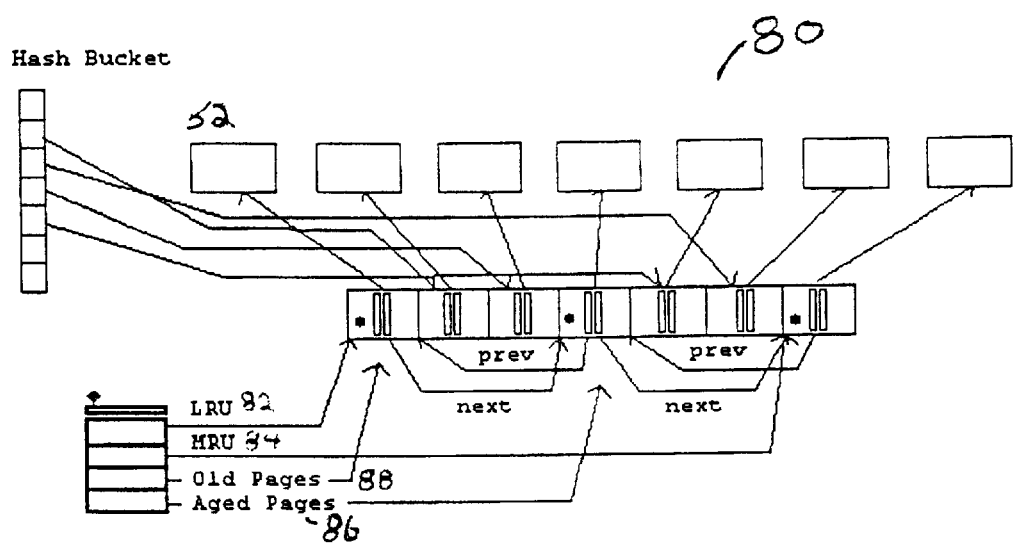
FIG. 3 illustrates a recently used page list according to the invention.

With reference to FIG. 2 and FIG. 3, according to the invention, hierarchical victim selection assigns pages buffers 52 to one level of a set 59 of hierarchical levels 60, 62, 64 and 68. An individual level of the set 59 is a collection of free pages or recently unpinned pages arranged in least recently used (unpinned) order. Pages in a level are chained together via pointers 69 from a head (or least recently used page) to a tail (or most recently used page) The pages in a level share similar characteristics in terms of their favorability as victim pages. For example, free pages are assigned to level 0 (60), cold pages to level 1 (62), warm pages to level 2 (64), and hot pages to level 3 (66). In the preferred embodiment clean pages (i.e pages that have been accessed but are unmodified at the time of unpinning) and dirty pages (i.e. modified pages at the time of unpinning) are segregated. Dirty pages are assigned to level 4 (68) where they are further subdivided into level 1, level 2 and level 3 dirty pages (collectively 70). A dirty page cannot be replaced from memory without having to write the dirty page out the contents to the database 49 in a slow long term data storage 48. Replacing a dirty page incurs the cost of writing out the dirty page and reading in the new page whereas replacing a clean page requires only a reading in of the new page. It is preferable to clean the dirty pages in advance of their selection for victimization, preferably asynchronously, to avoid unnecessary delays.

For clean or dirty pages, the decision as to which of clean levels 1, 2 or 3 (62, 64, or 66) or dirty levels 1, 2 or 3 (70) respectively to assign a page 52 is based on a measure of the favorability of victimizing the buffer. Such a measure may be determined, as in the preferred embodiment, by the unpin weight and the reference count of the page 52 as well as its clean/dirty status. The unpin weight is a future use measure, being a rating such as a number indicating how likely the buffer manager 54 thinks the page 52 is going to be referenced in the future. In database systems, it is known, for example, that certain control pages will be accessed more often that other types of pages. In this way the anticipated use of that page may be taken into account when predicting the likelihood of early re-use of the page.

The reference count is a perceived use measure, being a rating such as a number indicating how many times the page 52 has been fixed since it came in the bufferpool 50. The more likely the page 52 is needed in the future, the higher will be the level to which the page 52 is assigned and the less likely it will be that the page 52 is selected next for page replacement. Thus hot pages having high reference counts are assigned to level 3 and cold pages having a low reference count are assigned to level1.

It is understood that the measure of the favorability of victimizing the buffer may be determined by either the future use measure, the perceived used measure or both measures. Other factors, such as the number of time slices assigned to a particular buffer may be calculated as a perceived use measure.

After a page 52 is assigned to a level of the set 59 it may be fixed and then unpinned with different future or perceived use measure values. If the page has previously been assigned to a level, HVS looks at the current future and perceived use values to determine the appropriate level for the unpinned page. If the level is unchanged from the previous assignment, a further perceived use measure is examined to determine whether to move the page from that previously assigned level. A further perceived use measure may be the length of time since the last unpinning which caused the page 52 to be assigned to its present level. If this length of time is within a further perceived use measure threshold, the page 52 may be moved to the tail end of a level and otherwise not moved from the level to which it was previously assigned.

In the preferred embodiment, each level of the set 52 is comprised of a recently used page list 80 as shown in FIG. 3. A recently used page list 80 is a double linked list structure that is used to keep unpinned pages 52 in LRU order. The list 80 uses a Latch to protect the Head (LRU) 82 and Tail (MRU) 84 pointers when a page 52 is being added to the list 80. In some instances, the Latch also protects the Aged Pages 86 pointer and Old Pages 88 pointer.

To increase concurrency in maintaining the LRU lists, preferably, each level comprises more than one least recently used page list. For example, the pages in level0, level1, and level2 may be managed by four lists while pages in level3 may be managed by two lists. In this way, multiple software Agents 72, as discussed below, may maintain the lists concurrently with enhanced efficiency by avoiding excessive lock-outs when competing for the same page buffer resources.

With reference to FIG. 2 and FIG. 3, victim selection may be accomplished by one, or preferably more, software Agents 72 that look in the set 59 of hierarchical levels for pages to release as directed by a Search Finite State Machine 74 according to a preferred victimization scheme. In the preferred embodiment, an Agent 72 starts by looking for free pages in level 0 (60). If there are no free pages in level 0 (60), the Agent 72 indexes into the Search Finite State Machine 74 (FSM) to retrieve a preferred level to look for pages and the type of the page it should look for in that level. The entries in the FSM 74 will cause Agents 72 to look for either any pages in level 1 (62), or just old pages in level 2 (64) or level 3 (66). If there are no pages of the specified type in the specified level, the Agent 72 will just search for any page in all levels starting from level 1 (62) and up to level 4 (68).

When the number pages released from level 1 (62) reaches a threshold count, pages currently assigned to level 2 (64) are aged. The process of ageing a level updates two pointers in that level. The Old Pages 88 pointer is assigned the last value of the Aged Pages 86 pointer, and the Aged Pages 86 pointer is assigned the value of the current Tail 84 pointer. After a level has been aged more than once, pages between the Head 82 and the Old Pages 88 pointer are considered old pages and can be victimized, because they have stayed within the old pages range without being moved out of the range as a result of additional page fixes. Similarly, after a threshold number of level 2 (64) pages are victimized, level 3 (66) pages may be aged.

In the preferred embodiment, when level 0 is empty, the FSM enforces the rule that 40% of the time, level 1 (62) is used to search for pages; 40% of the time, level 2 (64) is used to search for pages, and the remaining 20% of the time, level 3 (66) is used. If there are no pages in level 1 or aged pages in levels 2 (64) or level 3 (66) ready for victimization, each level is examined in turn from lowest to highest to find any victim. As a result, level 4 (68) is searched only when there are no clean pages to victimize.

When a page 52 is victimized, its identity and reference count is copied to a history table 78. If the page 52 is ever brought back, its last reference count can be used to decide more appropriately, what level should be assigned to the page 52 on page unpin.

Victim selection and aging are explained in the following paragraphs with reference to FIG. 4 and pseudo-code.

All free pages in the bufferpool are linked to level 0 (60). As pages are taken out of level 0 (60) and unpinned, they are assigned and distributed to the different levels in the hierarchy as described in the addMRU( ) pseudo-code below. As shown by FIG. 4, unpinned pages are added to different levels from Time 1 to Time 10.

Just before Time 1, there were 16 unpinned pages in level 1 (62), 3 unpinned pages in level 2 (64), and 2 unpinned pages in level 3 (66). The 6th page in level 1 (66) was re-fixed, after the last time it was unpinned, so it is removed from its last position in the level 1 (62) LRU chain and reassigned to the Tail of level 1 (62) on page unpinning.

In Time 1, 4 pages are victimized from level 1 (62), leaving 12 pages chained in level 1 (62). At Time 2, 4 more pages are victimized from level 1 (62), making a total of 8 pages victimized since Time 1. In this example, after every 8 pages that are victimized from level 1 (62), the next higher non-empty level is aged. The process of ageing a level advances the Old Pages 88 pointer to the last Aged Pages 86 pointer, then advances the Aged Pages 86 pointer to the current Tail 84 pointer. Pages between the Head 82 pointer and the Old Pages 88 pointer become eligible for page replacement as described in the getvictim( ) pseudo-code For example, in Time 4, 6 pages in level 2 (64) become eligible for victim selection, just as are the 3 remaining unpinned pages in level 1 (62). The 6 pages in level 2 (64) became eligible because they were seen the first time 8 pages were taken out of level 1 (62) and then seen again the second time another 8 pages were taken out of level 1 (62). Time 7 shows a similar scenario where 8 more pages become eligible for victim selection in level 2. (66) If any of the pages in the old pages range between the Head 82 and Old Pages 88 pointers were hot pages that got fixed and unpinned, it would have been moved further down the LRU chain of a level and out of the old pages range. This can be seen in Time 8, where 2 pages were taken out of the old pages range of level 2 (64) and moved to the Tail 84 of level 1 (62) and level 3 (66).

Figure 4:
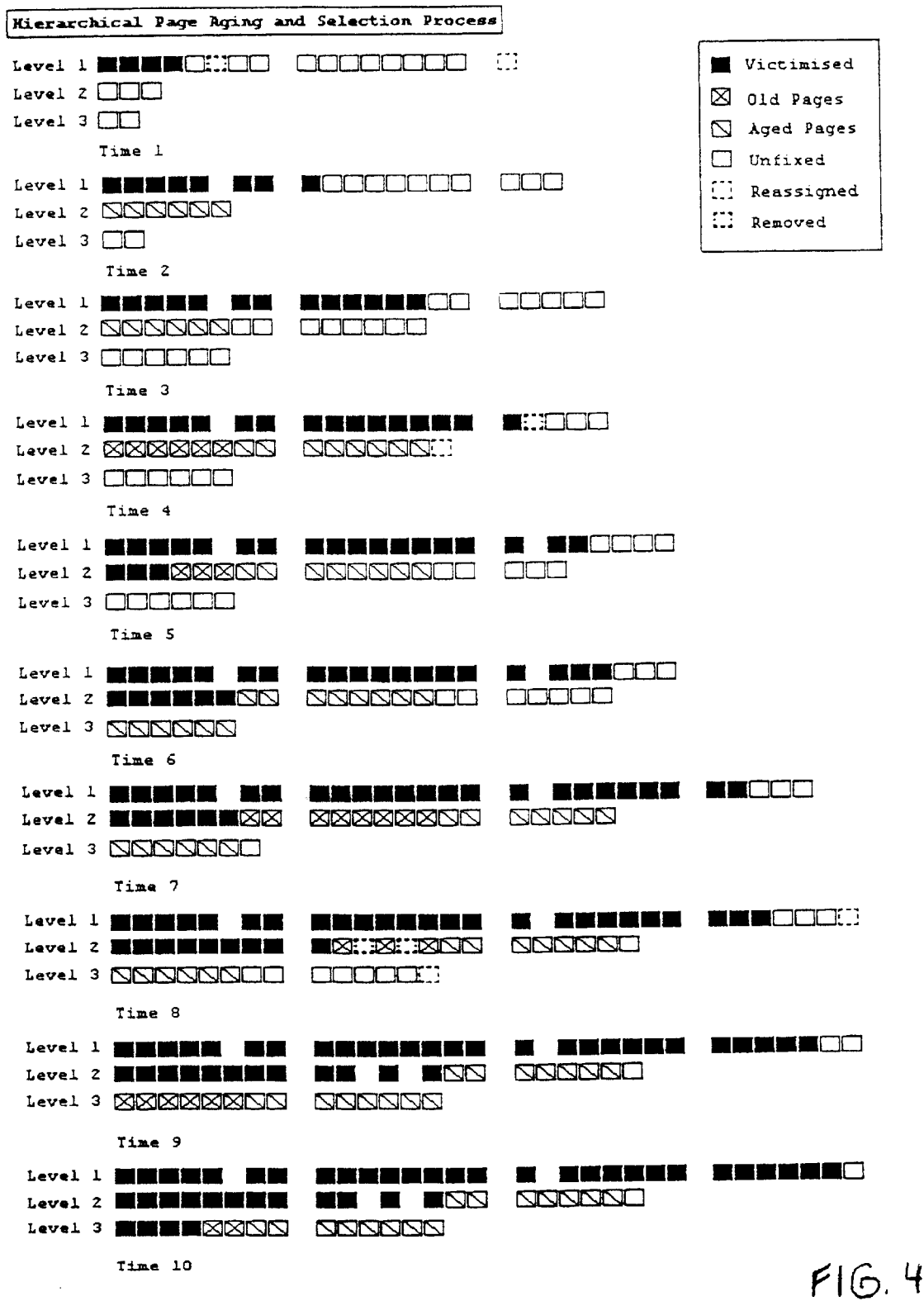
FIG. 4 illustrates, by means of a time slice chart, the operation of the method for managing a set of buffers represented in FIG. 2.

As shown in FIG. 4, for every 6 pages victimized in level 2 (64), level 3 (66) pages get aged. This can be seen in Time 6 and in Time 9. Simultaneous victim selection occurs in Time 5, 6, 8, and 10, where one Agent 72 is victimizing pages in level 1 (62), while another is victimizing pages in either level 2 (64) or level 3 (66).

Simultaneous victim selection is occurring because different Agents 72 can be in different states of a Search Finite State Machine 74. For example, after indexing into the Search FSM 74, one Agent 72 may be asked to get regular unpinned pages in level 1 (62) while another Agent 72 may be directed to get a page from the old pages range in level 2 (64). Simultaneous victim selection may also occur on the same level because each level is using more than one LRU list.

```
getVictim ( )
{
loop:
    if level 0 not empty
    {
        get victim from level 0;
    }
    if (no victim returned)
    {
        localIndex = AgentLocalIndex;
        AgentLocalIndex ++;
        if  (AgentLocalIndex == 10)
            AgentLocalIndex = 0;
        preferredLevel = fsm.Level[localIndex]; // = {1, 2, 1, 2, . . . ]
        OldPagesOnly = fsm.Kind[localIndex]; // = {R, 0, R, 0, . . . }
        NthListInLevel = fsm.ListN[localIndex]; // = {0, 0, 1, 1, . . . }
        if  (OldPagesonly)
        {
                if(preferredLevel OldPtr != NULL)
                    removeLRU( OldPagesOnly, preferredLevel,
                        NthListInLevel);
        }
        else
        {
                if (preferredLevel is not empty)
                    removeLRU( AnyPage, preferredLevel,
                        NthListInLevel);
        }
        if(no victim returned)
                // use first level that is not empty starting from
                level 1
                    and up to 4;
                removeLRU( AnyPage, 1 to 4, 0 to n );
    }
    if (victim returned)
    {
        conditional page latch
        if conditional page latch fail, loop again;
        if conditional page latch work, get bucket latch then
        if (ptr->fixcount > 0 || ptr->level != NO LEVEL) then
            loop again;
        else ptr->fixcount++ and return victim;
    }
    else
    {
        loop a couple of times before suggesting bufferpool is full;
    }
}
```

```
ptr removeLRU(OldPagesOnly, level, listInLevel)        // Called by
                                                       getVictim()
{
    if(OldPagesOnly && OldPtr = = NULL)
        return;
    ptr = NULL;
    LATCH list
        ptr = Head;
        if (Head != Tail)
        {
                Head = Head->next;
                Head->prev = NULL;
        }
        else
                Head = Tail = NULL;
        if (ptr)
        {
                ptr->level = NO-LEVEL;
                ptr->next = NULL;
                list->count++;
                list->count &= list->AgeCount;   // AgeCount
                                                 equals:
                                      // level1 = 128-1, level2 = 32-1;
        }
    UNLATCH list
    if (ptr)
    {
        if (ptr == OldPtr)
                OldPtr = NULL;
```

```
        if (ptr == AgedPtr)
                AgedPtr = NULL;
        if (list->count == 0)
        {
                listToAge = first non-empty level that is > than
                current
                            level;
                ageList (listToAge);
        }
    }
}
```

```
ageList(level, listInLevel)              // Called by removeLRU ()
{
    LATCH list
        OldPtr = AgedPtr;
        AgedPtr = Tail;
    UNLATCH list
}
```

The operation of the allocation of an unpinned page 52 to a level from the set 59 of hierarchical levels according to the present invention may be understood with reference to the following pseudo-code listing.

```
addMRU(ptr, level, listInLevel)         // Page Latched before call and
                                        Unlatched after call.
{
    curTime = GLOBAL_Time++;
    level = ptr-level;
    if (level ! = NO-LEVEL)
    {
        AddPage = decideWhetherToReorder(ptr, level, curTime);
        if( AddPage
            remove (ptr, level, ptr->listInLevel);
    }
    else
        AddPage = TRUE;
    if( AddPage )
    {
        LATCH list;
        if (Tail != NULL)
        {
                Tail->next= ptr;
                ptr->prev= Tail;
                Tail       = ptr;
        }
        else
                Head = Tail = ptr;
        ptr->level = list->level;
        ptr->listInLevel = listInLevel;
        ptr->lastUnpinnedTime = GLOBAL-Time;
        UNLATCH list
    }
}
```

```
// Called by addMRU ()
decideWbetherToReorder(ptr, newLevel, currentUnpinnTime)
{
    reorder = FALSE;
    if (ptr->lastUnpinnedTime > currentUnpinnTime)
    {
        timeDiff = MAXUINT – ptr->lastUnpinnedTime +
        currentUnpinnTime;
    }
    else
    {
        timeDiff = currentUnpinnTime – ptr->lastUnpinnedTime;
    }
    if currentLevel is lower than newLevel
```

-continued

```
        {
                it timeDiff > promotionThreshold; // say 10;
                        reorder = TRUE;
        }
        else currentLevel is higher than newLevel
        {
                if timeDiff > demotionThreshold; // say 5;
                        reorder = TRUE;
        }
        else
        {
                if timeDiff > sameListThreshold; // say 7;
                        reorder = TRUE;
        }
        return reorder;
```

```
// Called by addMRU ()
remove(ptr, level, listInLevel)
{
        LATCH list
        if (ptr->level == level)
        {
                if (ptr == Head)
                {
                        if (Head != Tail)
                        {
                        Head = Head->next;
                        Head->prev = NULL;
                        }
                        else
                        {
                        Head = Tail = NULL;
                        }
                }
                else if (ptr == Tail)
                {
                        Tail = Tail->prev;
                        Tail->next = NULL;
                }
                else
                {
                        ptr->prev->next = ptr->next;
                        ptr->next->prev = ptr->prev;
                }
                ptr->level = NO LEVEL;
                if (ptr == OldPtr)
                        OldPtr = ptr->prev;
                If (ptr == AgedPtr)
                        AgedPtr = ptr->prev;
        UNLATCH list
        ptr->next = NULL
}
```

As set out in FIG. 2, the following additional structures are maintained by the buffer manager:

*Hierarchical Page Replacement Control Block 76—This structure houses an array of Recently Used Page List structures that represent the different hierarchical levels of bufferpool pages.

*History Table 78—This is an array of hash entries where each entry contains the poolID, pool page number, and reference count of a page that was unchained from the bufferpool. There is a history table for each bufferpool hash bucket.

The purpose of the reference counts and history table 78 is for the system to be able to remember the hot pages in the database. When a page 52 is fixed, the fixcount is incremented to tell the system the page is to be pinned. Every time the fixcount is incremented, the reference count is incremented. Decrementing the fixcount does not affect the reference count.

When a page 52 is unchained because of victim selection, its poolID is used to hash into the history table 78 pointed to by the hash bucket where the page is currently chained to. The history table 78 entry is used to remember the poolID, pool page number and reference count of the page 52. If the current history table 78 entry is already used by another page 52, that entry may be replaced. When a page 52 is read back into the bufferpool 50, the history table 78 is examined by hashing to see if the page was previously in the bufferpool 50. If the page history is located, the prior reference count is associated with the page 52 and incremented. Preferably, the hash function is a mask operation on the poolID of the page 52.

As discussed, the level a page 52 is assigned to is based on the unpin weight and reference count of the page. Table 1 shows a preferred manner of how these levels may be assigned:

TABLE 1

| Weight v.s. Reference Count (r#) | weight 0 unchained | weight 0 chained | weight 1 chained | weight 2 chained | dirty pages with weight N |
|---|---|---|---|---|---|
| r# <= 2 | level 0 | level 1 | level 1 | level 2 | dirtyN+O |
| r# > 2 <=10 | level 0 | level 1 | level 2 | level 3 | dIrtyN+1 |
| r# > 10 | level 0 | level 2 | level 3 | level 3 | dirtyN+1 |

According to the invention and with reference to FIG. 2, Hierarchical Victim Selection provides the infrastructure for page cleaners 79 to transform dirty buffers to clean buffers to ensure that the next candidate pages for victimization will be clean pages. To accomplish this, dirty pages are segregated from clean pages into different levels in separate lists so that they can be cleaned asynchronously. On dirty steal triggers, page cleaners 79 access hierarchy level 4 (68), where dirty pages are linked on page unpinning, to write out the dirty pages to the database 49 in LRU order. The thus cleaned pages are then individually unpinned and moved to appropriate levels namely level1, level2 or level3 (62, 64 or 66) in the clean pages hierarchy. As a last resort, when getvictim( ) must search for dirty victims in the hierarchy levels of level 4 (68) that comprises only dirty pages, it first looks at the dirty list for level 1, then the dirty list for level 2, then the dirty list for level 3.

HVS guides processes to use different lists when adding pages based on the perceived use measure and future use measure. HVS guides victimizing Agents to use different lists in the various levels when removing pages through a Finite State Machine. Thus HVS promotes simultaneous page management by various processes because they can act on different levels concurrently. However, it is feasible to use other methods for enabling concurrency but likely at the expense of enhanced efficiency. For example, different processes may randomly pick pages from a set of page lists. One process may pick list 1 while another randomly picks list 4. In a sufficiently random system, each list should be adequately serviced. While such a scheme may provide reasonable concurrency, it is not particularly effective in discriminating between hot and cold pages. Moreover, there is apparently no meaningful manner to age pages because pages are randomly assigned.

It is apparent to one skilled in the art that such a page management system for database buffers may be extended to other memory management systems such as for maintaining virtual memory.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

Although the present invention has been described with reference to preferred embodiments, those skilled in the art will recognize that changes may be made in form and detail without departing from the spirit and scope of the invention. As such, it is intended that the foregoing detailed description be regarded as illustrative rather than limiting and that it is the appended claims, including all equivalents thereof, which are intended to define the scope of the invention.

The embodiment of the invention in which an exclusive property or privilege are claimed are defined as follow:

1. A method of managing database system memory using page buffers comprising:
    determining, for each buffer, a measure of the favorability for victimizing the buffer;
    assigning each buffer in an order to one of a plurality of list levels, said one list level selected according to the measure of the favorability for victimizing the buffer, the plurality of list levels denoting a buffer hierarchy for prioritizing the victimization of buffers, in part, by weighting the list levels differently; and
    victimizing page buffers from different list levels based on the buffer hierarchy of the plurality of list levels and the order of the buffers in the list levels.

2. The method of claim 1 wherein the assigning comprises:
    placing the buffer in a first level if the buffer's measure of the favorability for victimizing the buffer indicates the buffer is cold;
    placing the buffer in a second level if the buffer's measure of the favorability for victimizing the buffer indicates the buffer is warm;
    placing the buffer in a third level if the buffer's measure of the favorability for victimizing the buffer indicates the buffer is hot.

3. The method of claim 1 further comprising:
    determining if the buffer has previously been assigned to a level and, if so, determining a further measure of favorability for victimization for the buffer previously assigned; and
    wherein said assigning based additionally on the further measure of favorability for victimization.

4. The method of claim 3 wherein the determining a further measure of favorability for victimization for the buffer comprises calculating the amount of time since the buffer was last assigned to a level.

5. The method of claim 1 further comprising:
    determining a buffer content characteristic for each buffer; and
    wherein the assigning based additionally on the buffer content characteristic.

6. The method of claim 5 wherein the buffer content characteristic comprises a clean/dirty data status, the buffer hierarchy distinguishing clean buffers in the plurality levels from dirty buffers in the plurality of levels.

7. The method of claim 6 further comprising transforming the dirty buffers in the buffer hierarchy to clean buffers in the buffer hierarchy.

8. The method of claim 1 further comprising:
    aging the buffers in the levels to identify buffers as eligible for victimization according to the buffer hierarchy and the order of the buffers in the levels.

9. The method of claim 1 wherein the victimizing comprises:
    determining a preferred level from the plurality of levels from which to release a buffer according to a preferred victimization scheme;
    locating the buffer for releasing upon examination of the preferred level; and
    releasing the buffer.

10. The method of claim 9 wherein the locating further comprises:
    if the preferred level has no buffer for releasing, examining one or more additional levels according to the buffer hierarchy and the order of the buffers in the levels to locate the buffer for releasing.

11. The method of claim 1 wherein the determining a measure of the favorability for victimizing the buffer comprises determining a perceived use measure of the buffer.

12. The method of claim 1 wherein the determining a measure of the favorability for victimizing the buffer comprises determining a future use measure of the buffer.

13. The method of claim 11 wherein the determining a measure of the favorability for victimizing the buffer further comprises determining a future use measure of the buffer.

14. The method of claim 13 wherein the victimizing comprises:
    storing the perceived use measure for each buffer and wherein the determining a future use measure of the buffer comprises retrieving said perceived use measure for use in determining the future use measure.

15. The method of claim 1 wherein the order by which the buffer is assigned to the level is a least recently used order.

16. The method of claim 1, wherein the victimizing comprises victimizing in parallel multiple page buffers from different levels using the buffer hierarchy of the plurality of list levels and the order of the buffers in the levels.

17. A computer program product for use on a database system computer having a memory, said memory managed using page buffers, the computer product comprising:
    a recording medium;
    means recorded on said medium for instructing the computer to perform:
        determining, for each buffer, a measure of the favorability for victimizing the buffer;
        assigning each buffer in an order to one of a plurality of list levels, said one list level selected according to the measure of the favorability for victimizing the buffer, the plurality of list levels denoting a buffer hierarchy for prioritizing the victimization of buffers, in part, by weighting the list levels differently; and
        victimizing page buffers from the different list levels based on the buffer hierarchy of the plurality of list levels and the order of the buffers in the list levels.

18. The computer program product of claim 17 wherein said means recorded on said medium further instructing the computer to perform:
    determining if the buffer has previously been assigned to a level and, if so, determining a further measure of favorability for victimization for the buffer previously assigned; and
    wherein said assigning based additionally on the further measure of favorability for victimization.

19. The computer program product of claim 17 wherein said means recorded on said medium further instructing the computer to perform:
    determining a buffer content characteristic for each buffer; and wherein the assigning based additionally on the buffer content characteristic.

20. The computer program product of claim 19 wherein the buffer content characteristic comprises a clean/dirty data status, the buffer hierarchy distinguishing clean buffers in the plurality levels from dirty buffers in the plurality of levels.

21. The computer program product of claim 20 wherein said means recorded on said medium further instructing the computer to perform transforming the dirty buffers in the buffer hierarchy to clean buffers in the buffer hierarchy.

22. The computer program product of claim 17 wherein said means recorded on said medium further instructing the computer to perform:

aging the buffers in the levels to identify buffers as eligible for victimization according to the buffer hierarchy and the order of the buffers in the levels.

23. The computer program product of claim 17 wherein the victimizing comprises:

determining a preferred level from the plurality of levels from which to release a buffer according to a preferred victimization scheme;

locating the buffer for releasing upon examination of the preferred level; and releasing the buffer.

24. The computer program product of claim 23 wherein the locating further comprises:

if the preferred level has no buffer for releasing, examining one or more additional levels according to the buffer hierarchy and the order of the buffers in the levels to locate the buffer for releasing.

25. The computer program product of claim 17 wherein the determining a measure of the favorability for victimizing the buffer comprises determining a perceived use measure of the buffer.

26. The computer program product of claim 17 wherein the determining a measure of the favorability for victimizing the buffer comprises determining a future use measure of the buffer.

27. The computer program product of claim 25 wherein the determining a measure of the favorability for victimizing the buffer further comprises determining a future use measure of the buffer.

28. The computer program product of claim 27 wherein the victimizing comprises storing the perceived use measure for each buffer and wherein the determining a future use measure of the buffer comprises retrieving said perceived use measure for use in determining the future use measure.

29. The computer program product of claim 17 wherein the order by which the buffer is assigned to the level is a least recently used order.

30. The computer program product of claim 17, wherein the victimizing comprises victimizing in parallel multiple page buffers from different levels using the buffer hierarchy of the plurality of list levels and the order of the buffers in the levels.

31. A memory management system for a database system having a memory using page buffers, said memory management system comprising:

a means for determining, for each buffer, a measure of the favorability for victimizing the buffer;

a means for storing the buffers in an order in a plurality of list levels;

a means for assigning each buffer in the order to one of the plurality of list levels, said means for assigning operative in response to the measure of the favorability for victimizing the buffer, the plurality of list levels denoting a buffer hierarchy for prioritizing the victimization of buffers, in part, by weighting the list levels differently; and a means for victimizing page buffers from different list levels based on the buffer hierarchy of the plurality of list levels and the order of the buffers in the list levels.

32. The memory management system of claim 31 wherein the means for assigning comprises:

a means for placing the buffer in a first level if the buffer's measure of the favorability for victimizing the buffer indicates the buffer is cold;

a means for placing the buffer in a second level if the buffer's measure of the favorability for victimizing the buffer indicates the buffer is warm;

a means for placing the buffer in a third level if the buffer's measure of the favorability for victimizing the buffer indicates the buffer is hot.

33. The memory management system of claim 31 further comprising:

a means for determining if the buffer has previously been assigned to a level; and a means for determining a further measure of favorability for victimization for the buffer previously assigned;

said means for assigning operative additionally on the further measure of favorability for victimization if the buffer has previously been assigned to the level.

34. The memory management system of claim 1 further comprising:

a means for storing a buffer content characteristic comprising a clean/dirty status for each buffer;

a means for determining the buffer content characteristic for each buffer; and wherein the means for assigning operative additionally on the buffer content characteristic, the buffer hierarchy distinguishing clean buffers in the plurality levels from dirty buffers in the plurality of levels.

35. The memory management system of claim 34 further comprising a means for transforming the dirty buffers in the buffer hierarchy to clean buffers in the buffer hierarchy.

36. The memory management system of claim 31 further comprising:

a means for aging the buffers in the levels to identify buffers as eligible for victimization according to the buffer hierarchy and the order of the buffers in the levels.

37. The memory management system of claim 31 wherein the means for victimizing comprises:

a means for determining a preferred level from the plurality of levels from which to release a buffer according to a preferred victimization scheme;

a means for locating the buffer for releasing upon examination of the preferred level; and a means for releasing the buffer.

38. The memory management system claim 37 wherein the means for locating further comprises:

a means for examining one or more additional levels according to the buffer hierarchy and the order of the buffers in the levels to locate the buffer for releasing operative if the preferred level has no buffer for releasing.

39. The memory management system of claim 31 wherein the measure of the favorability for victimizing the buffer comprises one or more measure selected from the group of perceived use measure and future use measure of the buffer.

40. The memory management system of claim 31 wherein the order by which the buffer is assigned to the level is a least recently used order.

41. The memory management system of claim 31, wherein the means for victimizing comprises means for victimizing in parallel multiple page buffers from different levels using the buffer hierarchy of the plurality of list levels and the order of the buffers in the levels.

* * * * *